Feb. 13, 1951        R. D. POWERS        2,541,282
SEPARATOR VALVE
Filed April 26, 1946
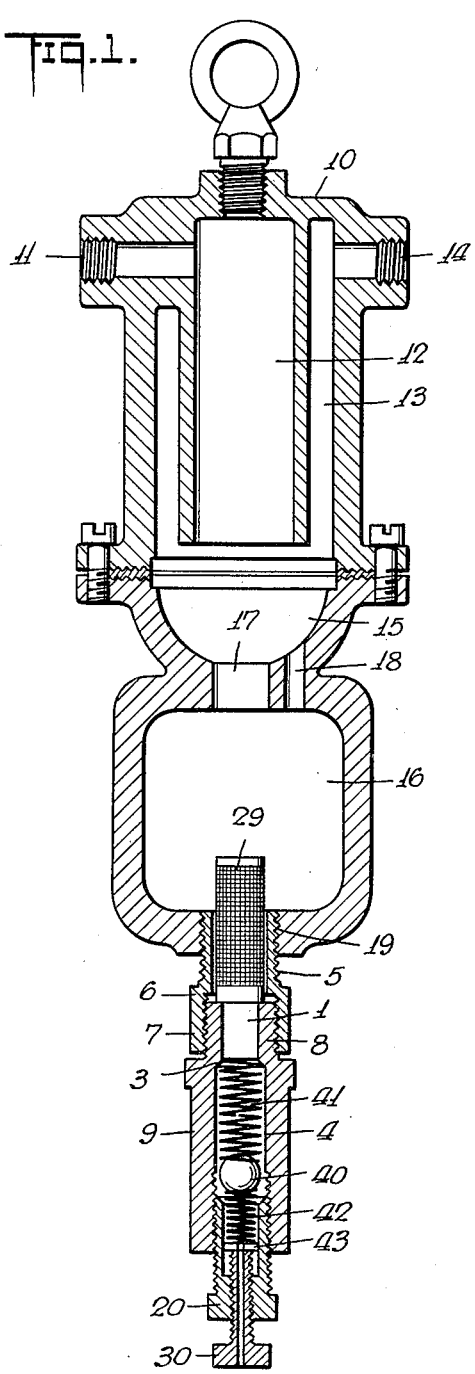
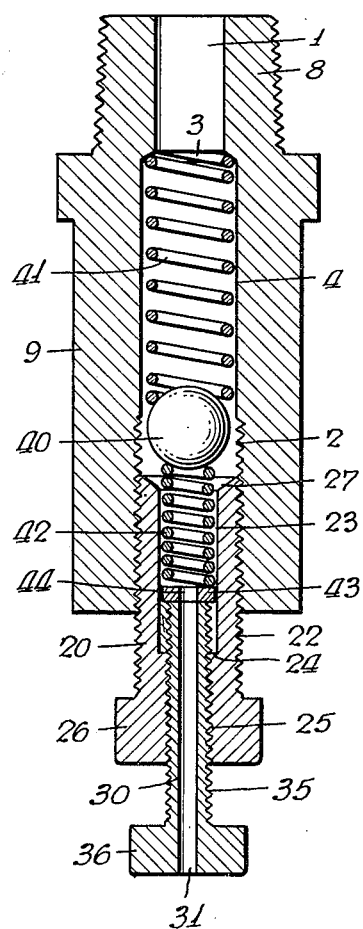
INVENTOR
*Ray D. Powers*
BY
ATTORNEY Patented Feb. 13, 1951

2,541,282

UNITED STATES PATENT OFFICE 2,541,282

SEPARATOR VALVE

Ray D. Powers, Orange, Mass., assignor to The Leavitt Machine Company, Orange, Mass., a corporation of Massachusetts Application April 26, 1946, Serial No. 665,144

4 Claims. (Cl. 137—34.2)

This invention relates to valves employed in conjunction with automatic separators, placed at points in a compressed air (or steam) system for the purpose of freeing the system of moisture, oil, dirt and other foreign substances. The function of the automatic separator valve is to control the discharge from the separator of the moisture, oil, dirt and the like separated out of the system. The valve is designed to open widely when the pressure in the system drops to or below a predetermined point (referred to as the "blow-off pressure") to permit a free flow, or blast, of compressed air to the atmosphere to blow out the moisture, oil and the like accumulated in the valve. The valve is further designed so that, under all other operating conditions, it will be open just sufficiently (referred to as "constant vent") to permit the substances, as they are separated, to discharge to atmosphere without appreciable loss of pressure.

It is one of the objects of the invention to provide a new and improved automatic separator valve having a constant vent and blow-off, as described above. An allied object is to provide an automatic separator valve of the character described which will be composed of relatively few parts, and of simple construction, and which will be trustworthy and efficient in operation. A further object is to provide an automatic separator valve of the character described which will have (a) provision for regulating the blow-off pressure or point at which or below which, the valve will blow-off; and (b) provision for regulating the area of the constant vent, at the normal or working pressure of the system. The latter adjustment (constant vent) enables the valve to be suited to the pressure and size of any particular system, and also to the amount of moisture, oil and dirt found in the system.

For the attainment of the foregoing and such other objects of invention as may appear or be pointed out herein, I have shown an embodiment of my invention in the accompanying drawing, wherein:

Fig. 1 is an elevational section through an automatic separator and the improved separator valve; and Fig. 2 is an elevational section, in enlarged scale, through the automatic separator valve of Fig. 1.

The improved automatic separator valve of this invention is shown in Fig. 1 in conjunction with an automatic separator which for purposes of illustration is shown as comprising a main casing 10 interposed in the compressed air system, the air entering an inlet 11 and leaving at outlet 14. Inlet 11 opens into a cylindrical expansion chamber 12 of enlarged cross section, which is open at the bottom and leads to an enlarged precipitating chamber 15. In its flow through the casing 10, and more particularly, downwardly in expansion chamber 12, the velocity of the air stream will be reduced so that moisture, oil and the like will be precipitated into chamber 15; the air stream itself flows around the lower edge of expansion chamber 12 and upwardly in the annular passageway 13, to outlet 14. The precipitated substances are immediately separated gravitationally from the path of the stream into a second chamber 16 through opening 17, the additional opening 18 being provided to equalize the air pressure between 16 and 15.

The valve has a main casing 9 which is secured to the lowest point of the separator by means of an adapter 6 of tubular formation, the lower portion of which is enlarged to form a mouth 7 provided with internal screw threads. The upper portion of the adapter is provided with external screw threads 5 by which the adapter is screwed into a tapped hole 19 at the lowest point of the separator. A strainer 29, frictionally fitted in the upper portion of the adapter, serves to block the entrance into the valve of particles of dirt or other foreign matter too large to pass through the valve passages and which would otherwise lodge themselves therein. The upper end of valve casing 9 is reduced at 8 and provided with external screw threads by which the valve casing is screwed into the mouth 7 of the adapter.

Valve casing 9 has a central passage comprising a short passage 1 at its upper portion and an enlarged passage 4 which extends for the major length of the casing. The juncture of enlarged passage 4 and upper passage 1 forms an annular shoulder 3. The lower portion of passage 4 is provided with internal screw threads 2; an elongated sleeve 20 has external screw threads 22 which screw into the internal threads 2 of the valve casing. The central passage or inner bore of elongated sleeve 20 comprises an enlarged passage 23 opening at its upper end and a passage 25 of somewhat smaller internal diameter opening at its lower end. The juncture of the inner passages 23 and 25 forms an annular shoulder 24. The lower passage 25 is provided with internal screw threads. A second elongated sleeve 30 of smaller diameter than the first mentioned elongated sleeve 20 has external screw threads 35 which screw into the internal threads 25 of the outer sleeve 20. The inner sleeve 30 has a central internal passage 31.

In order that the inner and outer elongated sleeves, respectively, 30 and 20, may be readily distinguished, the outer sleeve 20 will be referred to as the "regulating screw," and the inner sleeve 30, as the "regulating pin." Regulating screw 20 has a knurled enlargement 26 at its lower end and regulating pin 30 has a knurled enlargement 36, by means of which they may be turned (for the purposes subsequently described).

The upper end of regulating screw 20 is beveled to provide a seat 27 for a ball 40 which is of smaller diameter than the inside diameter of central passage 4 of the valve casing, so that ball 40 may be moved longitudinally in the casing. The ball is interposed between an upper compression spring 41 and a lower compression spring 42. The upper end of upper spring 41 seats on the aforementioned annular shoulder 3 between inner passages 1 and 4 of the casing. A seat may be provided for the lower end of lower spring 42 as by small disc 43 seated on the upper end of the regulating pin 30; the diameter of the disc is somewhat less than the inside diameter of passage 23 of the regulating screw so that the disc may be moved longitudinally therein. Disc 43 has a central hole 44 affording communication with the inner bore 31 of the regulating pin.

Communication through the valve, whether during blow-off or constant vent, follows the inner passages 1 and 4 of the casing, around ball 40, through inner passage 23 of regulating screw 20, center hole 44 of disc 43, and out through inner passage 31 of regulating pin 30.

Considering the valve apart from the pressure system, i. e., when the position of the valve ball 40 is not affected by any pressure or air flow in the system, the following observations may be made: The two springs 41, 42 will hold the ball in a position of balance at a point relative to the casing at which the compressive force of the two springs will be equal and opposite; this compressive force of the springs may be changed by turning either the regulating pin 30 or the regulating screw 20, except that in the latter case the valve seat 27 will be adjusted longitudinally of the casing 9; the change in the compressive force of the springs will also change the position of the ball 40 relative to casing 9; and the position of the valve seat 27 can be changed without effecting any change in the compressive force of the springs by holding the regulating pin against movement while the regulating screw is turned.

When the valve is in operative association with a compressed air system, the pressure thereof will apply a force upon the ball 40 in a downward direction. My invention contemplates that within a relatively wide range of adjustment of the valve parts the compressive force of the springs (when unaffected by this downward force upon the ball imposed when the valve is in operative association with the pressure system) balances the ball 40 at such distance from the seat 27, that the valve is in wide open position under such conditions. When the pressure of the system builds up to a point where the resultant downward force on the ball exceeds the then existing compressive force of the springs, the ball will move downwardly towards its seat until it reaches a position of balance between the forces acting thereon to provide the constant vent opening.

In the wide open position of the valve, the pressure of the system will blow out, i. e., clear the valve of all accumulations, and will constantly vent the system when ball 40 is closely adjacent valve seat 27. By the aforementioned adjustments of the valve, the pressure at which the valve is blown out and the rate at which the separated water, oil, etc. are discharged through the constant vent can be predetermined for maximum effectiveness for pressure systems of different pressures or sizes and for the discharge of different amounts of separated-out oil, water, etc.

The valve may be adjusted for efficient performance for any particular system briefly as follows: The pressure of the system is brought to the reduced pressure at which it is desired that the valve operate for blow-off and the valve parts then adjusted so that the blow-off will be effected at that reduced pressure. The pressure of the system is then raised to the normal or working pressure and the parts then adjusted to provide the constant vent opening which is required for effective venting of the substances separated out from that particular system.

There are occasions when it is desirable that the valve be blown out without reducing the pressure of the system to the blow-out point. This may be effected by a temporary adjustment of the valve parts for that purpose after which these parts are restored to their original adjusted position.

I claim:

1. An automatic separator valve for a system operating at a normal pressure, comprising, in combination, a casing having an inner bore, a valve seat disposed in the inner bore for adjustment relative to the casing, a pair of compression springs disposed in the said inner bore between a fixed point on the said casing and an adjustable abutment, a ball disposed in the inner bore above the said seat and interposed between the said pair of compression springs, means for manually adjusting the said abutment relative to the casing to vary the compressive force of the springs, and means for manually adjusting the said valve seat relative to the ball, said manually adjusting means being effective to dispose said ball a predetermined distance from its said valve seat to provide a constant vent at said normal pressure of the system.

2. An automatic separator valve, comprising, in combination, a casing having an inner bore enlarged to provide a central, longitudinal passage open at its lower end and an annular shoulder at its upper end, the lower portion of the passage being provided with internal screw threads; an elongated sleeve having external threads screwed into the casing for longitudinal adjustment therein and manipulative means at its lower extremity, said sleeve having an inner bore and a valve seat at its upper extremity, the lower portion of the inner bore being provided with internal screw threads; a second elongated sleeve having external threads screwed into the first-mentioned sleeve for longitudinal adjustment therein, manipulative means at its lower extremity, and an inner bore; a ball disposed within the said passage of the casing above the said seat and of a diameter somewhat less than the internal diameter of the passage; a compression spring interposed between the said annular shoulder of the passage and the said ball; a disc positioned on the upper end of the second-mentioned sleeve and apertured to afford communication to the inner bore thereof; and a second compression spring interposed between the said disc and the said ball.

3. An automatic separator valve, comprising, in combination, a casing having an inner bore enlarged to provide a central, longitudinal passage open at its lower end and an annular shoulder at its upper end, the lower portion of the passage being provided with internal screw threads; an elongated sleeve having external threads screwed into the casing for longitudinal adjustment therein and manipulative means at its lower extremity, said sleeve having an inner bore and a valve seat at its upper extremity, the lower portion of the inner bore being provided with internal screw threads; a second elongated sleeve having external threads screwed into the first-mentioned sleeve for longitudinal adjustment therein, manipulative means at its lower extremity, and an inner bore; a ball disposed within the said passage of the casing above the said seat and of a diameter somewhat less than the internal diameter of the passage; a compression spring interposed between the said annular shoulder of the passage and the said ball; and a second compression spring interposed between the upper end of the second-mentioned sleeve and the said ball.

4. An automatic separator valve, comprising, in combination, a casing having an inner bore, the lower portion thereof being provided with internal screw threads; an elongated sleeve having external threads screwed into the casing for longitudinal adjustment therein and provided with manipulative means, said sleeve having an inner bore and a valve seat at its upper extremity, the lower portion of the inner bore being provided with internal screw threads; a second elongated sleeve having external threads screwed into the first-mentioned sleeve for longitudinal adjustment therein, manipulative means, and an inner bore; a ball disposed within the said inner bore of the casing above the said seat, a compression spring disposed in the inner bore of the casing with one end abutting the said ball; and a second compression spring interposed between the upper end of said second-mentioned sleeve and the said ball.

RAY D. POWERS.

REFERENCES CITED

The following references are of record in the file of this patent:

UNITED STATES PATENTS

| Number | Name | Date |
| --- | --- | --- |
| 27,704 | Douglas | Apr. 3, 1860 |
| 701,754 | Moran | June 3, 1902 |
| 842,049 | Wolski | Jan. 22, 1907 |
| 961,590 | England | June 14, 1910 |
| 1,182,089 | Hert | May 9, 1916 |
| 1,450,561 | Parker | Apr. 3, 1923 |
| 1,766,666 | Meyer | June 24, 1930 |
| 1,784,664 | Eickholt | Dec. 9, 1930 |
| 1,871,546 | McClafferty | Aug. 16, 1932 |
| 1,937,855 | Stuard | Dec. 5, 1933 |